United States Patent [19]
Chappell, Jr. et al.

[11] Patent Number: 6,060,156
[45] Date of Patent: May 9, 2000

[54] POROUS ALUMINA AND PARTIALLY CALCINED POLYSILOXANE PARTICLES IN INTERDRAW COATING RESINS FOR POLYESTER FILM

[75] Inventors: Cornell Chappell, Jr., Petersburg; Junaid Ahmed Siddiqui, Richmond, both of Va.

[73] Assignee: E. I. du Pont de Nemours and Company, Wilmington, Del.

[21] Appl. No.: 09/050,328

[22] Filed: Mar. 30, 1998

[51] Int. Cl.[7] ........................................................ B32B 5/16

[52] U.S. Cl. ........................... 428/323; 428/328; 428/331; 428/327; 428/143; 428/145

[58] Field of Search ..................................... 428/323, 327, 428/328, 332, 141, 143, 144, 145, 147, 148, 331

[56] References Cited

U.S. PATENT DOCUMENTS

| | | | |
|---|---|---|---|
| 4,605,591 | 8/1986 | Nose et al. | 428/332 |
| 4,801,487 | 1/1989 | Kalus et al. | 428/206 |
| 5,047,278 | 9/1991 | Ono et al. | 428/141 |
| 5,520,993 | 5/1996 | Lambert | 428/215 |

FOREIGN PATENT DOCUMENTS

| | | | |
|---|---|---|---|
| 0 678 546 A2 | 4/1995 | European Pat. Off. | C08J 7/04 |
| 0 678 546 A3 | 4/1995 | European Pat. Off. | C08J 7/04 |
| 0 698 502 A1 | 2/1996 | European Pat. Off. . | |
| WO 96/01739 | 1/1996 | WIPO | B32B 27/20 |

*Primary Examiner*—William Krynski
*Assistant Examiner*—Hong J. Xu

[57] ABSTRACT

An orientated polyester film coated on at least one surface with a coating that improves its antiblocking properties is disclosed. The coating contains an organic polymer and about 0.002% to 1.5% by weight, based on the weight of the coating, of porous particles that have a pore volume of at least 0.03 mL/g and a particle size of about 0.5 $\mu$m to 4.5 $\mu$m.

20 Claims, No Drawings

POROUS ALUMINA AND PARTIALLY CALCINED POLYSILOXANE PARTICLES IN INTERDRAW COATING RESINS FOR POLYESTER FILM

FIELD OF THE INVENTION

This invention relates to polyester films. In particular, this invention relates to an orientated polyester film that is coated on at least one surface with an interdraw antiblocking coating.

BACKGROUND OF THE INVENTION

Films of polymeric linear polyesters have excellent draw orientation and have proved especially well suited for biaxial film orientation. These polymeric films, especially those of polyethylene terephthalate (PET), are strong and have excellent inherent chemical and thermal properties. In addition, they have good optical clarity, toughness, and static properties, which makes them extremely suitable for use a myriad of uses.

In order to enhance the commercial value of biaxially oriented polyester film, polymer containing coatings are applied to the film surface to promote adhesion, antistatic, release, water absorbency, oxygen barrier, water barrier, metallization, heat seal, and printing properties. Due to the poor static and dynamic coefficient of the coated surface, the coatings tend to block during the winding and slitting operations, producing poor quality mill rolls and slit rolls.

Submicron particles of alumina, silica, titania, zirconia, organic particles such as polymethyl methacrylate and polystyrene, and organically modified silicon beads have been added to the coating formulation as antiblocking agents, both in off-line and in-line in an interdraw process. When applied off-line, the antiblocking particles stay tightly bound to the coated surface of the polyester. However, when the coating containing the filler particles is applied on-line in an interdraw coating process, the particles tend to void during the transverse, or sideways, draw. The leads to undesirable filler wipe off. Wipe off, which causes the coating to lose its anti-blocking properties, becomes more serious as the size of the filler particles increases.

Coatings are preferably applied in-line at the interdraw stage, that is, after the film has been stretched in the longitudinal direction but before the film has been stretched in the transverse direction. Off-line coating requires an additional step to unwind the uncoated film, coat it, and then rewind the coated film, making off-line coating time consuming and expensive. Thus, a need exists for interdraw coatings for polyester film in which the filler particles are not subject to wipe off.

SUMMARY OF THE INVENTION

The invention is a coated polyester film comprising:
(a) an orientated polyester film, said film comprising a first surface and a second surface, and
(b) a coating on at least one of said surfaces, said coating comprising an organic polymer and about 0.002% to 1.5% by weight, based on the weight of the coating, of porous particles, the porous particles having a pore volume of at least 0.03 mL/g and a particle size of about 0.5 µm to 4.5 µm.

In a preferred embodiment of the invention, the porous particles are selected from the group consisting of porous alumina particles and partially calcined polysiloxane particles. The porous particles preferably have a particle size of about 0.5 µm to 2.5 µm. A preferred polyester film is polyethylene terephthalate film.

In another embodiment, the invention is a method for producing a coated polyester by coating the polyester film at the interdraw stage with a coating composition comprising an organic polymer and about 0.002% to 1.5% by weight, based on the weight of the total solids present in the coating composition, of porous particles, the porous particles having a pore volume of at least 0.03 mL/g and a particle size of about 0.5 µm to 4.5 µm.

DETAILED DESCRIPTION OF THE INVENTION

POLYESTER FILMS

Polyester films are well known to those skilled in the art. The polymer preparation and film manufacturing processes are well known to those skilled in the art and are disclosed in many texts, such as Encyclopedia of Polymer Science and Engineering, 2nd. Ed., Vol. 12, Wiley, New York, pp. 1–313, as well as in numerous patents, such as UK Patent 838,708. Polyester may be obtained by condensing one or more dicarboxylic acids or their lower alkyl diesters with one or more glycols. Preferred polyester films are those selected from the group consisting of polyethylene terephthalate (PET) film and polyethylene naphthanate film. These polymers are typically obtained by condensing the appropriate dicarboxylic acid or its lower alkyl diester with ethylene glycol. Polyethylene terephthalate is formed from terephthalate acid and ethylene glycol; polyethylene naphthanate is formed from 2,7-naphthalene dicarboxylic acid and ethylene glycol. The most preferred polyester film is polyethylene terephthalate film.

The thickness of the polyester film is not critical and should be appropriate for the intended application for the coated film. The film thickness is generally less than about 250 microns, typically less than about 175 microns, preferably less than 50 microns, and more preferably between 12 to 25 microns. The film can be transparent, or it can be pigmented as required for the intended application.

POROUS PARTICLES

The coating comprises, about 0.002% to 1.5% by weight, preferably 0.004% to 0.30% by weight, more preferably 0.006% to 0.020% by weight, based on the weight of the total solids present in the coating, of porous particles. The porous particles have a pore volume of at least 0.03 mL/g, typically 0.03 mL/g to about 0.6 mL/g, more preferably at least 0.1 mL/g, typically about 0.1 mL/g to 0.6 mL/g. The porous particles have a particle size of about 0.5 µm to 4.5 µm, preferably of about 0.5 µm to 3.0 µm, more preferably about 0.5 µm to 2.5 µm.

While not being bound by any explanation or theory, it is believed that the porosity of the porous particles enhances the adhesion of the particles to the polyester film. It is believed that the chains of the polymer in the coating enter the pores in the filler particles during the coating and/or drying process, thus minimizing or eliminating void formation in the coating during the transverse draw step in the manufacture of polyester film.

PARTIALLY CALCINED POLYSILOXANE PARTICLES

Porous particles of partially calcined polysiloxane can be used in coating composition. Polysiloxane particles comprise a three-dimensional polymer chain of the formula:

$$RxSiO_2-(x/2)$$

in which x is a positive number greater than or equal to 1, preferably 1 to 1.9, more preferably 1 to 1.5, and most preferably 1 to 1.2, and R is an organic group, such as an aliphatic hydrocarbon group, e.g., methyl, ethyl, or butyl, or an aromatic hydrocarbon, e.g., phenyl, an unsaturated group, e.g., vinyl, or a mixture of two or more of these groups.

R is preferably a hydrocarbon group having 1 to 8, more preferably 1 to 5, carbon atoms. R is most preferably methyl. Polysiloxane particles are described in detail in Mills, Siddiqui, and Rakos, WO 96/01739 (PCT/GB95/01589).

Polysiloxane particles have a cross-linked network of siloxane linkages, comprising a mixture of the following structures:

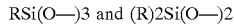

$$RSi(O-)_3 \text{ and } (R)_2Si(O-)_2$$

in which R is as defined above.

Suitable polysiloxane particles are commercially available from Toshiba Silicone Co., Ltd., Tokyo, Japan, under the name of "Tospearl" silicone resin particles. These particles have a three-dimensional network structure in which each silicon atom is bonded to one methyl group. Calcining eliminates some or all or the R group, reducing the value of x. If all of the organic group is eliminated (i.e., x is 0), the particle is converted to silica (SiO2).

Preferred "Tospearl" silicone resin particles are "Tospearl" 130, which has a mean particle size of 3.0 μm, and "Tospearl" 145, which has a mean particle size of 4.0 μm. "Tospearl" 130 is more preferred. Uncalcined submicron polysiloxane particles, such as "Tospearl" 105 which has a mean particle size about 0.5 microns, or submicron amorphous fused silica particles may also be added to the coating composition.

To form the partially calcined polysiloxane particles, the particles are calcined at about 300° C. to about 400° C. for about 30 min to about 3 hr, preferably at about 350° C. for about 45 min. Calcining may be carried out in air or in a suitable inert atmosphere, such as nitrogen. Elimination of some or all of the organic material during calcination reduces the weight of the particle. The particles preferably lose about 1% to about 2%, more preferably about 1%, of their original weight when calcined under these conditions. If weight loss exceeds more than about 2%, the pore volume decreases, as indicated by the increase in density of the particles.

POROUS ALUMINA

Particles of porous alumina can be used in coating composition. Porous alumina can be synthesized by reaction of a trialkyloxyaluminum (Al(OR)$_3$) with aqueous base. The resulting hydrous alumina can be calcined at between 600–700° C. to produce alumina that contains microporous and mesoporous alumina as well as submicron aggregates containing macropores.

COATING COMPOSITION

The coating is conveniently applied as an aqueous dispersion at a concentration and amount sufficient to produce a coating with the desired properties. Application from an aqueous medium is economically advantageous, avoids the potential explosion and/or toxicity hazards often associated with the use of volatile organic solvents, and eliminates the problem of residual odor frequently encountered when an organic solvent is used. The coating composition typically comprises about 3% to 18% total solids, preferably about 5% to about 10% total solids. As is well known to those skilled in the art, total solids refers to the total amount of non-volatile material in the coating composition, even though some of these materials may be non-volatile liquids at room temperature.

The coating composition comprises an organic polymer and about 0.002% to 1.5% by weight, preferably 0.004% to 0.30% by weight, more preferably 0.006% to 0.020% by weight, based on the weight of the total solids present in the coating, of porous particles. The particles may be added to any of the numerous conventional polymer-containing coatings that may be applied to the surface of a polyester film to enhance properties such as adhesion, antistatic, release, water absorbency, oxygen barrier, water barrier, metallization, heat seal, and printing properties.

Each of the coatings useful in the practice of the invention comprises at least one polymer. Other additives known in the art may be added to the coating composition for a specific purpose, such as cross-linking agents, dyes, pigments, lubricants, anti-oxidants, surface active agents, slip aids, gloss improvers, ultra-violet stabilizers, viscosity modifiers, dispersion stabilizers, etc. The composition of such coatings and the procedures for applying them are well known to those skilled in the art and are described in numerous patents and publications. Adhesion coatings, for example, are disclosed in Siddiqui, U.S. Pat. No. 5,132,356, incorporated herein by reference, particularly column 5, line 1, to column 6, line 50. Antistat layers are disclosed, for example, in Brennan, Wright, and Brabbs, EP 678,546. Polyester/polyalkylene oxide copolymers useful in antistat coatings are available from ICI Surfactants under the tradename of Milease® T textile finishing agent.

A coating that improves the adhesion of polyester to water-based hydrophilic coating formulations comprises (1) about 90% by weight to about 99% by weight of at least one sulfopolyester; (2) about 0.1 0% by weight to about 4% by weight of at least one polymer selected from the group consisting of polyacrylic acids, acrylamide/acrylic acid copolymers, and salts thereof; and (3) about 0.5% by weight to 7.0% by weight of at least one tetrablock copolymer resin; in which: % by weight of components (1), (2), and (3) is based on the total weight of components (1), (2), and (3) present in the coating; and components (1), (2), and (3) together comprise at least about 85% of the weight of the dry coating. Typically the coating comprises about 96% by weight to about 99% by weight of the at least one sulfopolyester, about 1.0% by weight to about 3.0% by weight of the at least one tetrablock copolymer resin, and about 0.2% by weight to about 1.0% by weight of the at least one polymer selected from the group consisting of polyacrylic acids, acrylamide/acrylic acid copolymers, and salts thereof. Typically, the at least one polymer selected from the group consisting of polyacrylic acids, acrylamide/acrylic acid copolymers, and salts thereof has a molecular weight of greater than 2 million and the polymer comprises about 25% by weight to about 60% by weight of acrylic acid. Typically, the tetrablock copolymer resin is derived from the sequential addition of ethylene oxide and then propylene oxide to ethylene diamine.

A coating that improves the adhesion of polyester film to gelatin comprises (1) about 85% by weight to about 98% by weight of one or more sulfopolyesters; (2) about 0.5% by weight to about 5% by weight of one or more tetrablock copolymer resins; and (3) about 2% by weight to about 12% by weight of one or more non-volatile polyamines; in which % by weight of the sulfopolyester or sulfopolyesters, tetrablock copolymer resin or resins, and non-volatile polyamine or polyarnines is based on the total of the weight of the one or more sulfopolyesters, the weight of the one or more tetrablock copolymer resins, and the weight of the one or more non-volatile polyamines present in the coating. Typically, the coating comprises: about 90% by weight to 95% by weight of the one or more sulfopolyesters; about 0.8% by weight to 3% by weight of the one or more tetrablock copolymer resins; and 3% by weight to 8% by weight of the one or more non-volatile polyamines. Typically, the coating typically has a thickness of about 0.05 to about 0.4 microns. Typically, the non-volatile polyamines comprises about 0.5% by weight to about 5% by weight, based on the total weight of the one or more non-volatile polyamines, of a high molecular weight (Wn of about 30,000 or greater) non-volatile polyamine or polyamines.

MANUFACTURE

In the typical manufacture of polyester film, polyester resin is melted and extruded as an amorphous sheet onto a polished revolving casting drum to form a cast sheet of the polymer. The cast sheet of polymer is heated to just above its glass transition temperature, 80° C. to 100° C. for polyethylene terephthalate, and is generally stretched or drawn in one or more directions. The film is typically stretched in two directions, the direction of extrusion (longitudinal direction) and perpendicular to the direction of extrusion (sideways or transverse direction) to produce a biaxially orientated film. The first stretching, which imparts strength and toughness to the film, conventionally ranges from about 2.0 to about 4.0 times its original length. Subsequent stretchings each also increase the size of the film about 2.0 to about 4.0 times. Generally, it is preferred to stretch first in the longitudinal direction and then in the transverse direction. The film is then heat set, generally at about 190° C. to 240° C. for polyethylene terephthalate, to lock in the strength, toughness, and other physical properties.

The coating is applied before final drawing of the film. For a uniaxially drawn film, the coating composition is applied during a predraw stage. For a biaxially orientated film, the coating composition is applied during an interdraw stage, that is, after the film has been stretched in one direction, but prior to stretching in the orthogonal direction.

Any conventional coating method, such as spray coating, roll coating, slot coating, meniscus coating, immersion coating, wire-bar coating, air knife coating, curtain coating, doctor knife coating, direct and reverse gravure coating, and the like, can be used to coat the coating composition. The coating is typically applied as a continuous coating. Although coating thickness will depend on the type of coating and its intended use, after drying, the coating typically has a thickness of about 0.04 $\mu$m to 2 $\mu$m, more typically, about 0.08 $\mu$m to about 1.0 $\mu$m, even more typically about 0.10 $\mu$m to about 0.20 $\mu$m.

Depending on the intended application for the film, the coating may be applied to one or both sides of the film. If the coating of the invention is only applied to one side, a different coating may be applied to the other side.

INDUSTRIAL APPLICABILITY

Polyester films, especially films of polyethylene terephthalate, have good optical clarity, toughness, and static properties, which makes them extremely suitable for use a myriad of uses, especially photographic and reprographic applications. Coated polyester films are used, for example, as ink jet receptor substrates, which are widely used widely used for presentation, graphic art, engineering drawing, and office application; as the base for photographic film and X-ray film; and as the image receptor sheet for electrographic imaging processes and xerographic imaging process, such as the receptor for overhead transparencies.

| Glossary | |
|---|---|
| Aerosil ® OX-50 | Amorphous fumed silica, discrete particle size 0.050 micron (Degussa, Ridgefield Park, NJ) |
| Alumina APA-ETA | Surface area = 341 m$^2$/g; pore volume = 0.49 cc/g; median particle size = 1.9 $\mu$m (Ceralox Division of CONDEA Vista, Tucson, Az) |
| Cymel ® 350 | Melamine/formaldehyde resin (American Cyanamid, Wayne, NJ) |
| Eastek ® 1300 | Sulfopolyester (30%) in water (Eastman Chemical Co., Kingsport, TN) |
| Glascol ® RP2 | Carboxylated acrylic polymer; 30% solids; T$_g$ = 58° C.; acid value (100% resin) = 80 (Allied Colloids, Suffolk, VA) |
| Glascol ® RP3 | Carboxylated acrylic copolymer; 48% solids; T$_g$ = -5° C.; acid value (100% resin) = 25 (Allied Colloids, Suffolk, VA) |
| Lupasol ™ FG | Low molecular weight polyethylenimine homopolymer, 98% solids; viscosity = 2,000 to 10,000 cps; M$_2$ = 800; M$_n$ = 600 (BASF, Parsippany, NJ) |
| Lupasol ™ P | High molecular weight polyethylenimine homopolymer, 50% solids; viscosity = 18,000 to 40,000 cps; M$_w$ = 750,000; M$_n$ = 60,000 (BASF, Parsippany, NJ) |
| Milease ® T | Aqueous dispersion of a textile finishing agent (ICI Surfactants, Wilmington, DE) |
| Poly (acrylamide acrylic acid, sodium salt) | Mw > 10 million, 40% carboxyl groups; (Polysciences, Warrington, PA) |
| Renex ® 690 | Nonoxynol-10 nonionic surfactant (ICI Americas, Wilmington, DE) |
| Tetronic ® 90R4 | Tetra-functional block copolymer derived from sequential addition of ethylene oxide and then propylene oxide to ethylene diamine; MW = 7,240; viscosity = 3,870 cps; mp = 12° C. (BASF, Parsippany, NJ) |
| Tosprearl 105 | Polysiloxane resin particles, mean particle size about 0.5 microns, specific surface area 70 m$^2$ (Toshiba Silicone Co., Ltd., Tokyo, Japan) |
| Tosprearl 130 | Polysiloxane resin particles, mean particle size 3.0 microns, specific surface area 20 m$^2$, linseed oil absorption 75 mL/100 g (Toshiba Silicone Co., Ltd., Tokyo, Japan) |

EXAMPLE 1

This example illustrates preparation of partially calcined polysiloxane particles. "Tosprearl" 130 polysiloxane resin particles were calcined in air at 300° C. for 45 min. The particles were analyzed by FTIR before and after calcining. Sharp infrared absorption peaks at 1288 cm$^{-1}$ and 2991 cm$^{-1}$ decreased in intensity when the particles were calcined.

EXAMPLE 2

This example illustrates a procedure for making a coating composition that improves toner adhesion of a polyester film, and coating the composition onto a film during the interdraw stage of the film manufacturing process.

The following ingredients were added to a 55 gal mixing tank under agitation: Glascol® RP3 (13.6 L of 48% solution), Glascol® RP2 (8.1 L of 30% solution), Renex® 690 surfactant (3.2 L of 20% solution), Aerosil® OX-50 amorphous fumed silica (0.75 L of 30% suspension in water), and 150 g of the partially calcined silicone particles prepared in Example 1. De-ionized water was added under agitation for efficient mixing to bring the contents of the tank to the 30 gal mark. Cymel® 350 (2.5 L) was added followed by deionized water to under agitation to bring the contents of the tank to the 50 gal mark. The resulting coating composition contained 6 to 7% total solids. It contained 0.08% by weight partially calcined silicone particles and 0.2% of amorphous fumed silica, based on the weight of the total solids present in the coating composition.

The coating composition coated onto polyethylene terephthalate film at the interdraw stage during the manufacture of the film. The wet coating thickness, measured by an infra-red gauge, was 7.5 to 8.5 microns. The dry coating thickness was 0.18 micron. The dynamic coefficient of friction was 0.42. The static coefficient of friction was 0.41. No filler wipe off was observed in the coated film as measured by a crock meter.

EXAMPLE 3

The procedure of Example 2 was repeated, except that the wet coating thickness, measured by an infra-red gauge, was 10.5 to 11.5 microns. The dry coating thickness was 0.21 micron. The dynamic coefficient of friction was 0.42. The static coefficient of friction was 0.41. No filler wipe off was observed in the coated film as measured by a crock meter.

EXAMPLE 4

The procedure of Example 2 was repeated, except that 150 g of alumina, grade APA-ETA, was used in place of the partially calcined polysiloxane particles. The wet coating thickness, measured by an infra-red gauge, was 7.5 to 8.5 microns. The dry coating thickness was 0.18 micron. The dynamic coefficient of friction was 0.42. The static coefficient of friction was 0.41. No filler wipe off was observed in the coated film as measured by a crock meter.

EXAMPLE 5

This example illustrates a procedure for making a coating composition, and coating the composition onto a film during the interdraw stage of the film manufacturing process.

Mileasel® textile finish (21.4 L of 1.8% solution) was added to a 55 gal mixing tank under agitation. Renex® 690 surfactant (125 mL of 20% solution) and lithium trifluoromethane sulfonate (830 g) were added. After 5 min, the partially calcined "Tospearl" 130 polysiloxane particles prepared in Example 1 (12 g) and "Tospearl" 105 submicron uncalcined polysiloxane particles (50 g) were added. The contents were thoroughly mixed for 20 min. The resulting coating composition contained about 6% total solids. It contained 0.006% by weight partially calcined silicone particles and 0.026% by weight submicron uncalcined polysiloxane particles, based on the weight of the total solids present in the coating composition.

The coating composition coated onto polyethylene terephthalate film at the interdraw stage during the manufacture of the film. The wet coating thickness, measured by an infra-red gauge, was 6 to 7 microns. The dry coating thickness was 0.02 micron. The film haze was 1.6% for a 100 micron thick film. The dynamic coefficient of friction was 0.32. No filler wipe off was observed in the coated film as measured by a crock meter.

EXAMPLE 6

The procedure of Example 5 was repeated, except that alumina, grade APA-ETA, was used in place of the partially calcined polysiloxane particles. The wet coating thickness, measured by an infra-red gauge, was 6 to 7 microns. The dry coating thickness was 0.02 micron. The film haze was 1.6% for a 100 micron thick film. The dynamic coefficient of friction was 0.32. No filler wipe off was observed in the coated film as measured by a crock meter.

EXAMPLE 7

This example illustrates a process for making a coating composition that improves film adhesion to water-based hydrophilic coatings, and coating a polyethylene terephthalate film with the composition during the interdraw stage of the manufacturing process.

Eastek® 1300 sulfopolyester (87.2 L; 26.2 Kg of polymer) was added to a 55 gallon mixing tank and agitation begun. De-ionized water was added under agitation for efficient mixing to bring the contents of the tank to the 25 gal mark. The following materials were added onto the resulting dispersion in the order given: 1600 mL of Lupasol™ FG (10% solution), 80 ML of Lupasol™ P (1% solution), 80 mL of Tetronic® 90R4, 50 g of Aerosil® OX-50 amorphous fumed silica, 25 g of partially calcined polysiloxane particles, and 1.9 L of Renex® 690 (20% solution in water). De-ionized water was added under agitation to bring the contents of the tank to the 50 gal mark and the resulting dispersion agitated for an additional 15 min. The resulting coating composition contained 16% total solids.

The coating composition was used for an interdraw coating during the manufacture of a polyethylene terephthalate film. The wet coating thickness, measured by an infra-red gauge, was 7.5 to 8.5 microns. The dry coating thickness was 0.32 micron. The dry coating weight was 0.048 g/m$^2$. The film haze was 3.2% for a 100 micron thick film. The dynamic coefficient of friction was 0.34. No filler wipe off was observed in the coated film.

EXAMPLE 8

This example illustrates a procedure for making a coating composition that improves toner adhesion of a polyester film, and coating the composition onto a film during the interdraw stage of the film manufacturing process.

The following ingredients were added to a 55 gal mixing tank under agitation: Glascol® RP3 (13.6 L of 48% solution), Glascol® RP2 (8.1 L of 30% solution), lithium trifluoromethane sulfonate (3.2 L of 20% solution), Renex® 690 (3.2 L of 20% solution), Aerosil® OX-50 amorphous fumed silica (1.00 L of 30% suspension in water), and 150 g of the partially calcined silicone particles prepared in Example 1. De-ionized water was added under agitation for efficient mixing to bring the contents of the tank to the 30 gal mark. Cymel® 350 (2.5 L) was added followed by deionized water to under agitation to bring the contents of .the tank to the 50 gal mark. The resulting coating composition contained 6 to 7% total solids. It contained 0.008% by weight partially calcined silicone particles and 0.2% by weight amorphous fumed silica, based on the weight of the total solids present in the coating composition.

The coating composition coated onto polyethylene terephthalate film at the interdraw stage during the manufacture of the film. The wet coating thickness, measured by an infra-red gauge, was 7.5 to 8.5 microns. The dry coating thickness was 0.18 micron. The dynamic coefficient of friction was 0.42. The static coefficient of friction was 0.41. No filler wipe off was observed in the coated film as measured by a crock meter.

Having described the invention, we now claim the following and their equivalents.

What is claimed is:

1. A coated polyester film comprising:
   (a) an orientated polyester film, the film comprising a first surface and a second surface, and
   (b) a coating on at least one of the surfaces, the coating comprising an organic polymer and about 0.002% to 1.5% by weight, based on the weight of the coating, of porous particles, the porous particles having a pore volume of at least 0.03 mL/g and a particle size of about 0.5 µm to 4.5 µm.

2. The coated polyester film of claim 1 in which the porous particles are selected from the group consisting of alumina particles and partially calcined polysiloxane particles.

3. The coated polyester film of claim 2 in which the coating comprises about 0.004% to 0.3% by weight, based on the weight of the coating, of porous particles.

4. The coated polyester film of claim 3 in which the particle size of about 0.5 µm to 3.0 µm.

5. The coated polyester film of claim 4 in which the pore volume is at least 0.1 mL/g.

6. The coated polyester film of claim 4 in which the porous particles are partially calcined polysiloxane particles.

7. The coated polyester film of claim 4 in which the porous particles are alumina particles.

8. The coated polyester film of claim 4 in which the coating comprises about 0.006% to 0.020% by weight, based on the weight of the coating, of porous particles.

9. The coated polyester film of claim 8 in which the porous particles are partially calcined polysiloxane particles.

10. The coated polyester film of claim 8 in which the porous particles are alumina particles.

11. The coated polyester film of claim 3 in which the coating comprises (1) about 90% by weight to about 99% by weight of at least one sulfopolyester; (2) about 0.10% by weight to about 4% by weight of at least one polymer selected from the group consisting of polyacrylic acids, acrylamide/acrylic acid copolymers, and salts thereof; and (3) about 0.5% by weight to 7.0% by weight of at least one tetrablock copolymer resin; in which: % by weight of components (1), (2), and (3) is based on the total weight of components (1), (2), and (3) present in the coating; and components (1), (2), and (3) together comprise at least about 85% of the weight of the dry coating.

12. The coated polyester film of claim 11 in which the coating comprises about 0.006% to 0.020% by weight, based on the weight of the coating, of porous particles.

13. The coated polyester film of claim 3 in which the coating comprises (1) about 85% by weight to about 98% by weight of one or more sulfopolyesters; (2) about 0.5% by weight to about 5% by weight of one or more tetrablock copolymer resins; and (3) about 2% by weight to about 12% by weight of one or more non-volatile polyamines; in which % by weight of the sulfopolyester or sulfopolyesters, tetrablock copolymer resin or resins, and non-volatile polyamine or polyamines is based on the total of the weight of the one or more sulfopolyesters, the weight of the one or more tetrablock copolymer resins, and the weight of the one or more non-volatile polyamines present in the coating.

14. The coated polyester film of claim 13 in which the coating comprises about 0.006% to 0.020% by weight, based on the weight of the coating, of porous particles.

15. The coated polyester film of claim 2 in which the particle size is about 0.5 µm to 2.5 µm, the pore volume is at least 0.1 mL/g, and the coating comprises about 0.006% to 0.020% by weight, based on the weight of the coating, of porous particles.

16. A coated polyester film formed by coating onto at least one surface of an orientated polyester film a coating composition comprising an organic polymer and about 0.002% to 1.5% by weight, based on the weight of the coating, of porous particles, the porous particles having a pore volume of at least 0.03 mL/g and a particle size of about 0.5 tm to 4.5 µm.

17. The coated polyester film of claim 16 in which the porous particles are selected from the group consisting of alumina particles and partially calcined polysiloxane particles.

18. The coated polyester film of claim 17 in which coating composition comprises 0.006% to 0.02% by weight, based on the weight of the total solids present in the coating composition, of porous particles, and the porous particles have a particle size of about 0.5 µm to 3.0 µm.

19. A method for forming a coated polyester film, the method comprising:

coating onto at least one surface of a polyester film a coating composition comprising an organic polymer and about 0.002% to 1.5% by weight, based on the weight of the total solids present in the coating composition, of porous particles, the porous particles having a pore volume of at least 0.03 mL/g and a particle size of about 0.5 µm to 4.5 µm; and stretching the film and increasing its size by about 2.0 to about 4.0 times.

20. The method of claim 19 in which the porous particles are selected from the group consisting of alumina particles and partially calcined polysiloxane particles, the coating composition comprises 0.006% to 0.02% by weight, based on the weight of the total solids present in the coating composition, of porous particles, and the porous particles have a particle size of about 0.5 µm to 3.0 µm.

* * * * *